June 24, 1947.  W. F. WOLFNER, 2D  2,422,873
ELECTRICAL CONDUCTIVITY CELL
Filed May 19, 1943
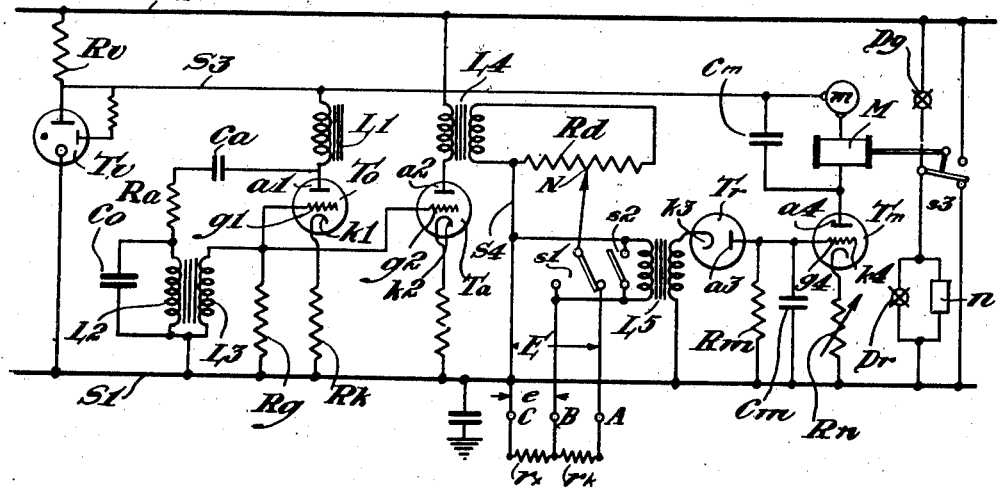
Fig.1
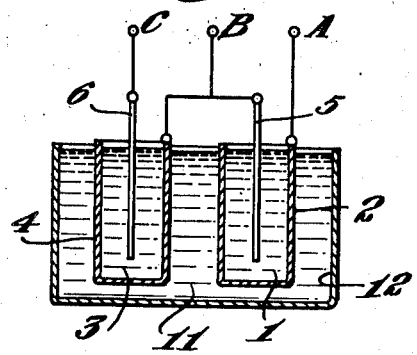
Fig.2
Fig.3
Fig.4
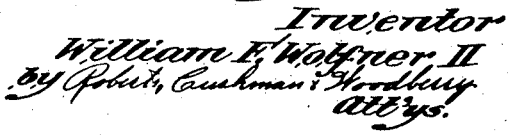
Inventor
William F. Wolfner II
by Roberts, Cushman & Woodbury
Attys.

Patented June 24, 1947

2,422,873

UNITED STATES PATENT OFFICE 2,422,873

ELECTRICAL CONDUCTIVITY CELL

William F. Wolfner, II, Asbury Park, N. J., assignor to Photoswitch Incorporated, Cambridge, Mass., a corporation of Massachusetts Application May 19, 1943, Serial No. 487,672

1 Claim. (Cl. 175—183)

This invention relates to the art of electric measurements and more particularly to the measuring of the conductivity of fluids.

Many industrial installations require equipment for the comparatively exact continuous supervision of the concentration of a conductive solution of varying temperature, with simple and rugged means which are self-contained, safe in operation, and independent of the type of electric power supply at hand. Such requirements must for example be met by equipment for measuring the salinity of feed water for ships' engines.

In accordance with such requirements, some of the principal objects of the present invention are to provide a device for the continuous measurement, or the announcement of a predetermined value, of the conductivity of material subject to temperature changes, to provide such a device which is effectively related to a self-contained source of current of substantially constant voltage and frequency for energizing an alternating current measuring circuit containing conducting material such as a fluid column, to provide an arrangement of this type which furnishes exact measurements regardless of changes of the temperature of the material to be measured and of the ambient temperature, to provide such a device which can be completely insulated from the electric network of the plant of which it is part, and in general to provide an electrical resistance measuring and supervising device of this type which is simple, rugged and safe in operation and hence especially suited for installations for which a minimum of maintenance and supervision and, as far as possible, absence of sources of failure is required.

According to the present invention, alternating current is supplied directly from a self-contained source of constant voltage and frequency, preferably an oscillator, to a column of known conductivity in series with one whose conductivity is to be measured. The potential drop across one of the columns is measured, the two columns being associated with means for securely maintaining them at the same temperature, preferably by immersing the column to be measured in an equalizing fluid having the temperature of the standard fluid column, which equalizing fluid may be that of the standard column itself; accordingly, a probe arrangement of this type is a further object of the invention.

These and other objects, aspects and features will be apparent from the description, by way of example of the genus of the invention, of several practical embodiments thereof, this description referring to a drawing in which Fig. 1 is the circuit diagram of a salinity indicator especially suited for use on board ship;

Fig. 2 is the diagram of one embodiment of the probe element indicated in Fig. 1; and Figs. 3 and 4 are diagrammatic sections of further practical embodiments of the probe element of Fig. 2.

The apparatus shown in Fig. 1 may be supplied from a direct current line $S1$, $S2$ from which current of practically constant voltage is derived by suitable conventional means indicated by a gas filled voltage regulator tube $Tv$ in series with limiting resistance $Rv$. It is evident that, with suitable rectifying means, an alternating current supply might be used.

Alternating current for the measuring circuit is derived from a conventional electronic oscillator, preferably of a type which is essentially stable with frequency, connected to constant voltage supply $S1$, $S2$. Such an oscillator may consist of tube $To$ with anode $a1$, grid $g1$ and cathode $k1$. The anode circuit, separated from the direct current supply by choke coil $L1$, feeds through bypass condenser $Ca$ and feed-back control resistance $Ra$ into a tuned circuit with condenser $Co$ and inductance $L2$ which is connected to supply terminal $S1$ and inductively coupled to inductance $L3$ connected to grid $g1$. Suitable potential levels for cathode $k1$ and grid $g1$ are provided by resistances $Rg$ and $Rk$.

The oscillatory energy of the tuned circuit is applied, through coupling resistance $Rg$, to the control grid $g2$ of amplifier and buffer tube $Ta$ whose anode $a2$ is connected to the primary of a transformer $L4$ whose secondary feeds into a detecting circuit with potentiometer resistor $Rd$, terminal wire $S4$ and tap $N$. The tap $N$ of resistor $Rd$ is connected to a probe contact $A$. The primary of a transformer $L5$, which couples the detecting circuit to a measuring circuit, is connected on the one side to a second probe contact $B$ and on the side to terminal $S4$ and a third probe contact $C$. Tap $N$ may be arranged for change over from contact $A$ to contact $B$, by means of switch $s1$, and the primary of transformer $L5$ may have a bridging switch $s2$.

The secondary of transformer $L5$ is on the one side connected to supply terminal $S1$, and on the other to cathode $k3$ of a rectifier tube $Tr$ whose anode $a3$ is coupled, by means of resistor $Rm$, to the grid $g4$ with condenser $Cm$ of a measuring amplifier tube $Tm$ with anode $a4$ and cathode $k4$. Proper relation between the potentials of grid $g4$ and cathode $k4$ is maintained by means of adjustable resistance $Rn$.

The anode $a4$ of meter tube $Tm$ is connected to lead $S3$ through a meter relay coil $M$ in series with a meter $m$.

Meter relay coil $M$ actuates a change-over switch $s3$ which, with the current in the anode circuit of $Tm$ below a certain value, energizes a signal lamp $Dr$ and with that current above this value, energizes instead a signal lamp $Dg$. An alarm device $n$ may be connected in parallel with Dr. As shown in Fig. 1, the movable contact of switch s3 may be connected to a point between lamps Dg and Dr connected in series between source terminals S1 and S2, and the two fixed contacts joined to S1 and S2, respectively, so that either Dg or Dr and n is bridged depending on the position of the movable contact of s3.

Between the probe terminals A and B is connected a known resistance $r_k$, and between terminals B and C the resistance $r_x$, of similar temperature-resistance relation, to be measured. In the present instance, $r_k$ is represented by a column of liquid of predetermined conductivity, whereas $r_x$ is the resistance of the column of liquid whose conductivity is to be detected, indicated and measured. These columns may for example consist of sea water, in which case the conductivity will be proportionate to the salinity of the water.

For the purpose of compensating for temperature variations, these solutions are arranged within a compensating medium, for example as indicated in Fig. 2, where V is a vessel containing a fluid column representing resistance $r_k$, where U is a vessel with a fluid column of unknown varying resistance $r_x$, and where W is a container filled with heat conducting material which maintains $r_k$ and $r_x$ at the same temperature.

In the embodiment according to Fig. 3 a standard solution 1, representing resistance $r_k$, is contained in a conducting vessel 2 connected to terminal A. The solution 3 of varying concentration flows through conducting vessel 4 conductively connected to a probe 5 immersed in solution 1. A second probe 6 is immersed in solution 3 and connected to terminal C, whereas both vessel 4 and probe 5 are connected to terminal B. Both vessels 2 and 4 are immersed in heat conducting but electrically insulating liquid 11 contained in vessel 12.

Instead, the arrangement according to Fig. 4 may be used, which is somewhat simpler than that of Fig. 3. In this embodiment, the standard resistance solution 15 in closed vessel 16 serves also as temperature equalizing solution, and envelopes the solution 17 to be measured, flowing through closed vessel 18. Probe 19 is connected to terminal A, vessel 18 to terminal B, and probe 20 to terminal C. The probes and vessels are properly insulated from each other as indicated in Fig. 4; suitable ducts for carrying the fluid 17 to be supervised through vessel 18 are indicated at 21 and 22.

This arrangement functions as follows:

The output energy of the oscillator applies a substantially constant voltage E, of substantially constant frequency, across points S4 and N of detecting resistor Rd, which voltage E is applied to terminals A and C. The voltage E and the voltage e between terminals C and B follow the relation $$e(r_x + r_k) = r_x E$$

where $r_k$ is the known resistance of solution 1 in vessel 2 (Fig. 2) and $r_x$ the unknown varying resistance of solution 3 in vessel 4. Hence, $$e = \frac{r_x}{r_x + r_k} E$$

The standard solution comprising $r_k$ is a solution of the same substance as is present in solution $r_x$ and the two solutions will therefore have substantially the same temperature coefficient of resistance. The expression $$\frac{r_x}{r_x + r_k}$$

is then independent of the temperature.

The voltage e appears between terminals B and C, and hence across transformer L5 which impresses a voltage proportionate thereto on grid g4 of tube Tm, upon rectification by tube Tr.

Accordingly, the conductivity of tube Tm will be proportionate to e and therefore to $r_x$ by the expression $$e = \frac{r_x}{r_x + r_k} E$$

and coil M will respond and move switch s3 when resistance $r_x$ is below, and hence the concentration of solution 3 exceeds a predetermined value, this response being unaffected by the temperature of equalizing liquid 11 in vessel 12. Millimeter m, if properly calibrated, will directly indicate the concentration of solution 3.

By adjusting magnet M for response at a selected value of e, a green lamp Dg can be caused to burn so long as the concentration remains below a permissible value proportionate to that value of e, whereas the red lamp Dr will light up and the alarm sound when the concentration exceeds that permissible value.

It will now be understood that the standard solution need not be connected between terminals A and B, but can be connected between B and C, with the unknown solution connected between A and B provided that a function between E and e is maintained which is similar to that explained above with reference to Fig. 2.

It will also be understood that a single device according to Fig. 1 can be used for supervising the concentration at a considerable number of points, by arranging a selector switch at terminal points A, B, C, as for example indicated at s4 of Fig. 4, where A1, B1, C1; A2, B2, C2 indicate the terminals of detecting units similar to the one shown in that figure.

It will be apparent that devices of the type herein described can be used not only for measuring the conductivity of liquids but also for measuring that of solid material either comminuted or in single pieces. If powdered material is to be tested, a probe quite similar to those of Figs. 2 to 4 but having suitably widened ports 21 and 22 can be used; for the testing of piece specimen, contact clamps replacing for example probes 2, 4, 5 and 6 of Fig. 3 will be employed.

It will be further evident that connection of tap N with terminal B by means of switch s1 will apply the full potential of N to L5 and hence effect the maximum reading of meter m, whereas closure of switch s2 will shunt L5 and hence effect the minimum reading of meter m.

Still further, it will be apparent that the measuring circuit of the device according to the invention is completely isolated from the power supply lines by insulating transformers which can be grounded.

It should be understood that the present disclosure is for the purpose of illustration only and that this invention includes all modifications and equivalents which fall within the scope of the appended claim.

I claim:

Apparatus for detecting the electric conductivity of fluid of varying temperature comprising: a first and a second vessel of which at least the second is conductive and which are adapted to receive a first and a second fluid, respectively, one of which fluids is of known conductivity and the other of which is of unknown conductivity; five mounting bushings, four of which are mounted in the walls of said first vessel and the fifth of which is of insulating material and is mounted in the wall of said second vessel; said second vessel being mounted in the first of said bushings, extending substantially within said first vessel, and having a portion exterior to said first vessel mounting said fifth bushing; a first and a second pipe means extending through the second and third of said bushings, rigidly connected to said second vessel, and adapted to pass fluid through said second vessel; a first probe electrode extending substantially into said first vessel through and supported by the fourth of said bushings; a second electrode extending substantially into said second vessel through and supported by said fifth bushing; and three terminals adapted for making connections to said first electrode, said second electrode and said second vessel respectively.

WILLIAM F. WOLFNER, II.

REFERENCES CITED

The following references are of record in the file of this patent:

UNITED STATES PATENTS

| Number | Name | Date |
| --- | --- | --- |
| 933,015 | Bishop | Aug. 31, 1909 |
| 1,870,995 | Greer | Aug. 9, 1932 |
| 2,254,400 | Starr | Sept. 2, 1941 |
| 1,807,321 | Behr | June 2, 1931 |
| 1,826,886 | Keeler | Oct. 13, 1931 |
| 2,254,399 | Starr | Sept. 2, 1941 |
| 2,370,609 | Wilson et al. | Feb. 27, 1945 |

FOREIGN PATENTS

| Number | Country | Date |
| --- | --- | --- |
| 466,530 | Germany | Apr. 27, 1929 |
| 73,216 | Austria | Mar. 10, 1917 |